United States Patent
Chiba et al.

(10) Patent No.: US 11,390,058 B2
(45) Date of Patent: Jul. 19, 2022

(54) EASILY TEARABLE ALUMINUM-VAPOR-DEPOSITED BIAXIALLY ORIENTED FILM

(71) Applicant: Mitsubishi Gas Chemical Company, Inc., Tokyo (JP)

(72) Inventors: Tomo Chiba, Kanagawa (JP); Takafumi Oda, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 157 days.

(21) Appl. No.: 16/344,525

(22) PCT Filed: Oct. 13, 2017

(86) PCT No.: PCT/JP2017/037154
§ 371 (c)(1),
(2) Date: Apr. 24, 2019

(87) PCT Pub. No.: WO2018/083962
PCT Pub. Date: May 11, 2018

(65) Prior Publication Data
US 2019/0248116 A1    Aug. 15, 2019

(30) Foreign Application Priority Data

Nov. 4, 2016    (JP) .............................. JP2016-215941

(51) Int. Cl.
*B32B 27/08*    (2006.01)
*B32B 37/15*    (2006.01)
(Continued)

(52) U.S. Cl.
CPC ................ *B32B 27/08* (2013.01); *B32B 7/12* (2013.01); *B32B 15/088* (2013.01); *B32B 15/20* (2013.01);
(Continued)

(58) Field of Classification Search
CPC ........... B32B 1/00; B32B 7/12; B32B 15/088; B32B 15/20; B32B 27/08; B32B 27/20;
(Continued)

(56) References Cited

U.S. PATENT DOCUMENTS 5,591,520 A * 1/1997 Migliorini ............... B32B 27/32
428/347
8,945,702 B2    2/2015 Wuest et al.
(Continued)

FOREIGN PATENT DOCUMENTS

CN    101423135 A    5/2009
JP    S62-142151 A    6/1987
(Continued)

OTHER PUBLICATIONS

English machine translation of the description for JP H0655710 A, obtained from ESPACENET (Year: 1994).*
(Continued)

*Primary Examiner* — Eli D. Strah
*Assistant Examiner* — Thomas J Kessler
(74) *Attorney, Agent, or Firm* — Fitch, Even, Tabin & Flannery LLP

(57) ABSTRACT

The present invention provides an easily tearable aluminum-vapor-deposited biaxially oriented film in which at least an aluminum vapor deposition layer (A), a barrier layer (B), an adhesive layer (C), and a polypropylene layer (D) are layered in this order, wherein the barrier layer (B) includes a mixture of a polyamide (a) and an amorphous polyamide (b), the polyamide (a) includes diamine units including at least 70 mol % of constituent units derived from xylylene diamine and dicarboxylic acid units including at least 70 mol % of constituent units derived from a $C_{4\text{-}20}$ α,ω-straight-chain aliphatic dicarboxylic acid, the content of the polyamide (a) in the barrier layer (B) is 30-70% by mass, and the (Continued)

(a)    (b)

content of the amorphous polyamide (b) in the barrier layer (B) is 30-70% by mass.

11 Claims, 1 Drawing Sheet

(51) Int. Cl.
    *B32B 38/00*     (2006.01)
    *B32B 27/34*     (2006.01)
    *B32B 27/32*     (2006.01)
    *B65D 65/40*     (2006.01)
    *B65D 81/30*     (2006.01)
    *B32B 7/12*     (2006.01)
    *B32B 15/088*     (2006.01)
    *B65D 81/24*     (2006.01)
    *B32B 15/20*     (2006.01)

(52) U.S. Cl.
    CPC .............. *B32B 27/32* (2013.01); *B32B 27/34* (2013.01); *B32B 37/153* (2013.01); *B32B 38/0012* (2013.01); *B32B 38/0036* (2013.01); *B65D 65/40* (2013.01); *B65D 81/24* (2013.01); *B65D 81/30* (2013.01); *B32B 2038/0028* (2013.01); *B32B 2255/10* (2013.01); *B32B 2255/205* (2013.01); *B32B 2307/518* (2013.01); *B32B 2307/582* (2013.01); *B32B 2439/00* (2013.01); *Y10T 428/13* (2015.01); *Y10T 428/1352* (2015.01)

(58) Field of Classification Search
    CPC ......... B32B 27/32; B32B 27/34; B32B 27/36; B32B 27/40; B32B 37/153; B32B 38/0012; B32B 38/0036; B32B 2038/0028; B32B 2250/24; B32B 2255/10; B32B 2255/205; B32B 2264/102; B32B 2264/104; B32B 2270/00; B32B 2272/00; B32B 2307/31; B32B 2307/518; B32B 2307/546; B32B 2307/582; B32B 2307/71; B32B 2307/724; B32B 2307/7244; B32B 2307/732; B32B 2439/00; B32B 2439/70; B32B 2439/80; B65D 65/40; B65D 81/24; B65D 81/30; Y10T 428/13; Y10T 428/1352

See application file for complete search history.

(56) References Cited

U.S. PATENT DOCUMENTS

| | | |
|---|---|---|
| 2001/0010860 A1 | 8/2001 | Yamaguchi et al. |
| 2009/0053513 A1 | 2/2009 | Enzinger et al. |
| 2009/0110888 A1 | 4/2009 | Wuest et al. |

FOREIGN PATENT DOCUMENTS

| | | | | |
|---|---|---|---|---|
| JP | H06-55710 A | | 3/1994 | |
| JP | H09262945 A | * | 10/1997 | ............ B29C 55/14 |
| JP | H11-157027 A | | 6/1999 | |
| JP | 2000-052415 A | | 2/2000 | |
| JP | 2007-136969 A | | 6/2007 | |
| JP | 2008-540156 A | | 11/2008 | |
| WO | 2006/019092 A1 | | 2/2006 | |
| WO | 2017202827 A1 | | 11/2017 | |

OTHER PUBLICATIONS

English machine translation of the description for JP H09262945 A, obtained from ESPACENET (Year: 1997).*
Extended European Search Report issued in corresponding EP Application No. 17867934.6 dated Mar. 13, 2020 (8 pages).
International Search Report for PCT/JP2017/037154, dated Jan. 9, 2018, and English Translation submitted herewith (5 pages).
Office Action dated Jan. 4, 2021, in corresponding Chinese Patent Application No. 201780066038.0 and partial English Translation.
"International Plastics Handbook," edited by W. Woebken, translated by Liu Qing et al., Chemical Industry Publishing, 1998, pp. 259-260.
Sosin, S.L., "Synthetic Fibers Made of Petroleum and Natural Gas," translated by Chen Yaoting, China Industrial Publishing, 1965, pp. 66-77.

* cited by examiner

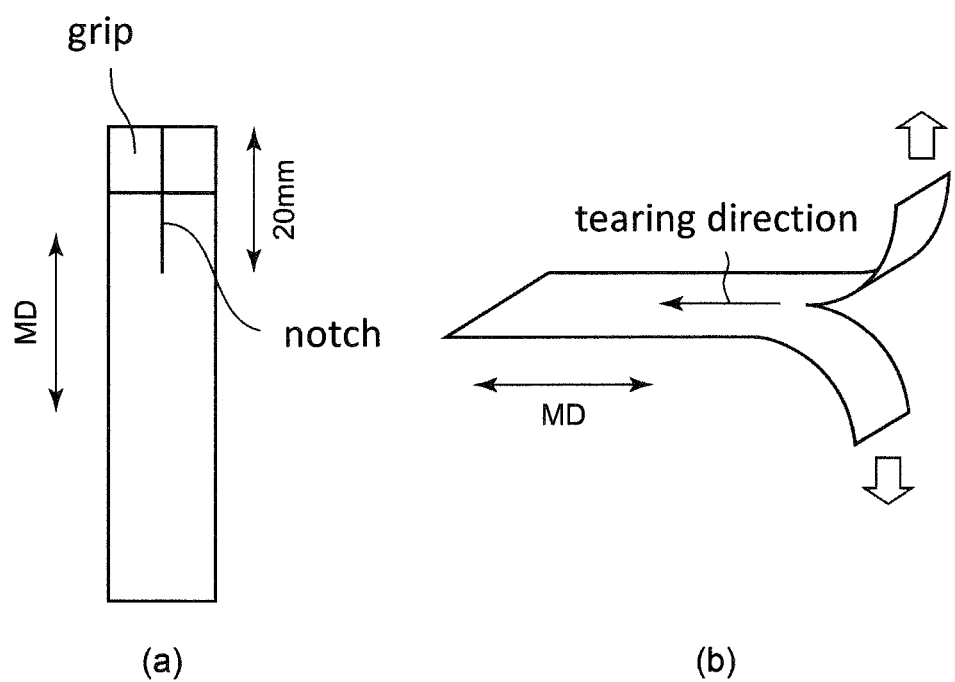

EASILY TEARABLE ALUMINUM-VAPOR-DEPOSITED BIAXIALLY ORIENTED FILM

CROSS-REFERENCE TO RELATED APPLICATIONS

This application is a U.S. national phase application filed under 35 U.S.C. § 371 of International Application Number PCT/JP2017/037154, filed Oct. 13, 2017, designating the United States, which claims priority from Japanese Application Number 2016-215941, filed Nov. 4, 2016.

FIELD OF THE INVENTION

The present invention relates to an easily tearable aluminum-vapor-deposited biaxially oriented film. Specifically, the present invention relates to an easily tearable aluminum-vapor-deposited biaxially oriented film which is suitably used for packaging foods, pharmaceutical products, etc.

BACKGROUND OF THE INVENTION

As films that can be used for packaging boil-in-the-bag foods, pharmaceutical products, etc., which are rapidly increasing recently, an easily tearable biaxially oriented film which can achieve a balance between gas barrier properties, easily tearable properties (linear cutting properties) and pinhole resistance (particularly flex pinhole resistance) has been increasingly desired.

For example, Patent Document 1 (Japanese National-phase PCT Laid-Open Patent Publication No. 2008-540156) discloses a protective film for packaging foods which has a polypropylene support layer, an adhesive layer, a barrier layer and a metal vapor deposition layer. The document proposes use of an amorphous or partially crystalline polyamide or a mixture of the polyamide and an ethylene vinyl alcohol copolymer as the barrier layer.

However, easily tearable properties and pinhole resistance of conventional protective films are not sufficient, and the improvement thereof has been desired.

CITATION LIST

Patent Literature

Patent Document 1: Japanese National-phase PCT Laid-Open Patent Publication No. 2008-540156

SUMMARY OF INVENTION

Under such circumstances, it is still desired to provide a protective film for packaging which can achieve a high-level balance between gas barrier properties, easily tearable properties and pinhole resistance.

The present inventors diligently made researches in order to solve the above-described problem, and when a mixture of a specific polyamide was used at a specific ratio as a barrier layer, easily tearable properties and pinhole resistance of a biaxially oriented film obtained were improved, and a high-level balance between gas barrier properties, easily tearable properties and pinhole resistance were successfully achieved. Thus the present invention was achieved.

Specifically, the present invention provides an easily tearable aluminum-vapor-deposited biaxially oriented film shown below.

[1] An easily tearable aluminum-vapor-deposited biaxially oriented film in which at least an aluminum vapor deposition layer (A), a barrier layer (B), an adhesive layer (C) and a polypropylene layer (D) are layered in this order, wherein:
the barrier layer (B) includes a mixture of a polyamide (a) and an amorphous polyamide (b);
the polyamide (a) includes diamine units including at least 70 mol % of constituent units derived from xylylene diamine and dicarboxylic acid units including at least 70 mol % of constituent units derived from a $C_{4-20}$ α,ω-straight-chain aliphatic dicarboxylic acid;
the content of the polyamide (a) in the barrier layer (B) is 30 to 70% by mass; and
the content of the amorphous polyamide (b) in the barrier layer (B) is 30 to 70% by mass.
[2] The easily tearable aluminum-vapor-deposited biaxially oriented film according to claim 1, wherein the amorphous polyamide (b) is at least one selected from the group consisting of nylon 6I (polyhexamethylene isophthalamide), nylon 6T (polyhexamethylene terephthalamide), nylon 6IT (polyhexamethylene iso-co-terephthalamide) and nylon 6I6T (polyhexamethylene isophthalamide/polyhexamethylene terephthalamide copolymer).
[3] The film according to item [1] or [2], wherein the barrier layer (B) has a wetting tension of 50 to 65 mN/m.
[4] The film according to any one of items [1] to [3], wherein the thickness of the barrier layer (B) is 0.5 to 7.5% relative to the total thickness of the easily tearable aluminum-vapor-deposited biaxially oriented film.
[5] The film according to any one of items [1] to [4], wherein the thickness of the easily tearable aluminum-vapor-deposited biaxially oriented film is 10 to 50 μm.
[6] The film according to any one of items [1] to [5], wherein the polypropylene layer (D) includes a recycled propylene layer (D1) and a propylene layer (D2).
[7] The film according to any one of items [1] to [6], which further has a heat-sealable resin layer (E) at the outer side of the polypropylene layer (D).
[8] The film according to any one of items [1] to [7], which has an oxygen transmission coefficient (OTC) at 23° C. and 60% RH of 0.001 to 0.008 cc·mm/(m²·atm·day).
[9] The film according to any one of items [1] to [8], wherein the number of defects after a Gelbo flex test (3000 times) at 23° C. and 50% RH is 0 to 30.
[10] A container, at least a part of which is made of the film according to any one of items [1] to [9].

According to a preferred embodiment of the present invention, it is possible to obtain an easily tearable aluminum-vapor-deposited biaxially oriented film, which can achieve a high-level balance between gas barrier properties, easily tearable properties and pinhole resistance, and which is excellent in surface appearance thereof. The easily tearable aluminum-vapor-deposited biaxially oriented film of the present invention is particularly suitable for packaging an article, which requires gas barrier properties and light-shielding properties, such as foods including boil-in-the-bag foods and confectioneries and pharmaceutical products.

BRIEF DESCRIPTION OF DRAWINGS

FIG. 1 shows explanatory drawings for explaining a method for evaluating easily tearable properties of film samples obtained in the Examples and Comparative Examples.

DESCRIPTION OF EMBODIMENTS

Hereinafter, the easily tearable aluminum-vapor-deposited biaxially oriented film of the present invention will be specifically described.

In the easily tearable aluminum-vapor-deposited biaxially oriented film of the present invention, at least an aluminum vapor deposition layer (A), a barrier layer (B), an adhesive layer (C) and a polypropylene layer (D) are layered in this order, and the film is characterized in that:

the barrier layer (B) includes a mixture of a polyamide (a) and an amorphous polyamide (b);

the polyamide (a) includes diamine units including at least 70 mol % of constituent units derived from xylylene diamine and dicarboxylic acid units including at least 70 mol % of constituent units derived from a $C_{4-20}$ α,ω-straight-chain aliphatic dicarboxylic acid;

the content of the polyamide (a) in the barrier layer (B) is 30 to 70% by mass; and the content of the amorphous polyamide (b) in the barrier layer (B) is 30 to 70% by mass.

In the easily tearable aluminum-vapor-deposited biaxially oriented film of the present invention, by using, as the barrier layer (B), a mixture obtained by mixing the polyamide (a) and the amorphous polyamide (b) at a specific ratio as described above, good gas barrier properties can be maintained while easily tearable properties and pinhole resistance can be improved. In addition, excellent surface appearance of the film can be obtained. In this regard, "a mixture of a polyamide (a) and an amorphous polyamide (b)" refers to a composition obtained by melt-mixing the polyamide (a) and the amorphous polyamide (b). For exertion of easily tearable properties, the dispersion state of the polyamide (a) and the amorphous polyamide (b) in the composition preferably has a sea-island structure, wherein the amorphous polyamide (b) is dispersed in the polyamide (a) or the polyamide (a) is dispersed in the amorphous polyamide (b).

According to a preferred embodiment of the present invention, the barrier layer (B) has good wettability, and therefore excellent adhesiveness to an aluminum vapor deposition layer is obtained. Accordingly, the aluminum vapor deposition layer is not easily detached from a biaxially oriented film, and excellent pinhole resistance and safety can be obtained, and therefore the film is suitable for packaging foods, pharmaceutical products, etc. Hereinafter, each layer of the easily tearable aluminum-vapor-deposited biaxially oriented film of the present invention will be explained.

Barrier Layer (B)

In the present invention, the barrier layer (B) includes a mixture of a polyamide (a) and an amorphous polyamide (b). In the present invention, the ratio of the mixture of the polyamide (a) and the amorphous polyamide (b) in the barrier layer (B) is preferably 80% by weight or more, more preferably 90% by weight or more, and even more preferably 95% by weight or more, and may be 99% by weight or more.

In the present invention, the polyamide (a) includes diamine units including at least 70 mol % of constituent units derived from xylylene diamine and dicarboxylic acid units including at least 70 mol % of constituent units derived from a $C_{4-20}$ α,ω-straight-chain aliphatic dicarboxylic acid.

Regarding the diamine units constituting the polyamide (a), because of imparting excellent gas barrier properties, and from the viewpoint of moldability, at least 70 mol %, preferably at least 80 mol %, more preferably at least 90 mol %, and even more preferably at least 95 mol % of constituent units derived from xylylene diamine are included in the diamine units.

Examples of xylylene diamine include orthoxylylene diamine, m-xylylenediamine and p-xylylenediamine. These may be used solely, or two or more of them may be used in combination. In the present invention, m-xylylenediamine, p-xylylenediamine or a mixture thereof is preferably used.

When using the mixture of m-xylylenediamine and p-xylylenediamine, the mass ratio between m-xylylenediamine and p-xylylenediamine (m-xylylenediamine:p-xylylenediamine) is preferably from 10:90 to 99:1, more preferably from 50:50 to 99:1, and even more preferably from 65:35 to 99:1.

The polyamide (a) may include diamine units other than the constituent units derived from xylylene diamine. Examples thereof include diamine units derived from compounds such as aliphatic diamines including tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine and 2,2,4- or 2,4,4-trimethylhexamethylenediamine; alicyclic diamines including 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin and bis(aminomethyl)tricyclodecane; and diamines having an aromatic ring including bis(4-aminophenyl)ether, p-phenylenediamine, p-xylylenediamine and bis(aminomethyl)naphthalene. These may be used solely, or two or more of them may be used in combination.

Regarding the dicarboxylic acid units constituting the polyamide (a), from the viewpoint of imparting adequate crystallizability and imparting flexibility, at least 70 mol %, preferably at least 80 mol %, more preferably at least 90 mol %, and even more preferably at least 95 mol % of constituent units derived from a $C_{4-20}$ α,ω-straight-chain aliphatic dicarboxylic acid are included in the dicarboxylic acid units.

Examples of the $C_{4-20}$ α,ω-straight-chain aliphatic dicarboxylic acid include succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,11-undecanedicarboxylic acid, 1,12-dodecanedicarboxylic acid, 1,13-tridecanedicarboxylic acid and 1,14-tetradecanedicarboxylic acid. These may be used solely, or two or more of them may be used in combination. Among them, a $C_{4-12}$ α,ω-straight-chain aliphatic dicarboxylic acid is preferred.

Among them, adipic acid, sebacic acid or a mixture thereof is preferably used because of excellent gas barrier properties, and from the viewpoint of availability.

The polyamide (a) may include dicarboxylic acid units other than the constituent units derived from the $C_{4-20}$ α,ω-straight-chain aliphatic dicarboxylic acid.

Examples of the dicarboxylic acid units other than the constituent units derived from the $C_{4-20}$ α,ω-straight-chain aliphatic dicarboxylic acid include aliphatic dicarboxylic acids having 3 or less carbon atoms such as oxalic acid and malonic acid; and aromatic dicarboxylic acids such as terephthalic acid, isophthalic acid and 2,6-naphthalene dicarboxylic acid. These may be used solely, or two or more of them may be used in combination. Among them, terephthalic acid and isophthalic acid are preferably used as the dicarboxylic acid units from the viewpoint of molding processability and barrier properties. The ratio of each of terephthalic acid and isophthalic acid is preferably 30 mol % or less, more preferably 1 to 30 mol %, and particularly preferably 5 to 20 mol % of the constituent units derived from the dicarboxylic acid. Terephthalic acid and isophthalic acid can be used solely. When using terephthalic acid and isophthalic acid in combination, the total content thereof is preferably within the above-described range.

Examples of the polyamide (a) particularly preferably used in the present invention include polyxylylene adipamide, isophthalic acid-copolymerized polyxylylene adipamide, polyxylylene sebacamide and polyxylylene dodecanamide. Among them, the polyamide (a) is preferably polyxylylene adipamide (polymethaxylylene adipamide, poly-para-xylylene adipamide), polyxylylene sebacamide (polymethaxylylene sebacamide, poly-para-xylylene sebacamide), isophthalic acid-copolymerized polyxylylene adipamide (isophthalic acid-copolymerized polymethaxylylene adipamide, isophthalic acid-copolymerized poly-para-xylylene adipamide) or a mixture thereof.

When the polyamide (a) is a mixture of polyxylylene adipamide and polyxylylene sebacamide, the mass ratio between polyxylylene adipamide and polyxylylene sebacamide (polyxylylene adipamide:polyxylylene sebacamide) is preferably from 55:45 to 85:15, more preferably from 60:40 to 80:20, and even more preferably from 65:35 to 80:20.

The polyamide (a) can be produced by polycondensation of a diamine component which can constitute the diamine units and a dicarboxylic acid component which can constitute the dicarboxylic acid units. For example, a polyamide can be produced by a method in which the temperature of a salt consisting of a diamine component and a dicarboxylic acid component is increased in the presence of water under pressure to perform polymerization in a molten state while removing the added water and condensation water. A polyamide can also be produced by a method in which a diamine component is directly added to a dicarboxylic acid component in a molten state to perform polycondensation under normal pressure. In this case, the diamine component is continuously added to the dicarboxylic acid component to keep the reaction system in a homogeneous liquid state, during which the polycondensation is allowed to proceed while increasing the temperature of the reaction system such that the reaction temperature does not fall below the melting point of the generated oligoamide and polyamide.

The polymerization degree can be controlled by adjusting the polycondensation conditions, etc. A small amount of monoamine or monocarboxylic acid may be added upon polycondensation as a molecular weight regulator. Moreover, in order to suppress the polycondensation reaction to achieve a desired polymerization degree, the ratio (molar ratio) of the diamine component and the carboxylic acid component constituting the polyamide (a) may be adjusted to shift from 1. Furthermore, in order to achieve the effect of promoting the amidation reaction and the effect of preventing coloring upon polycondensation, a publicly-known additive such as a phosphorus atom-containing compound, an alkali metal compound and an alkaline-earth metal compound may be added upon polycondensation of the polyamide (a).

From the viewpoint of heat resistance and melt-moldability, the melting point (Tm) of the polyamide (a) is preferably 170 to 290° C., more preferably 175 to 280° C., and even more preferably 180 to 270° C.

In the present invention, the amorphous polyamide (b) is a resin which does not have a clear melting point, and it means a polyamide, wherein when measured at a temperature raising rate of 20° C./min using a differential thermal analyzer, a crystal-melting heat quantity measured is less than 5 cal/g, preferably less than 3 cal/g, and more preferably less than 1 cal/g.

The amorphous polyamide (b) to be used in the present invention preferably includes: as the diamine component, an alicyclic diamine, an aliphatic diamine or a mixture thereof and as the dicarboxylic acid component, terephthalic acid, isophthalic acid or a mixture thereof.

Specific examples of the alicyclic diamine include bis(4-aminocyclohexyl)methane, bis(4-aminocyclohexyl)propane, bis(3-methyl-4-aminocyclohexyl)methane, bis(3-methyl-4-aminocyclohexyl)propane, bis(3,5-dimethyl-4-aminocyclohexyl)methane, bis(3,5-dimethyl-4-aminocyclohexyl)propane, bis(3-methyl-4-amino-5-ethylcyclohexyl)methane, bis(3-methyl-4-amino-5-ethylcyclohexyl)propane, bis(3,5-diethyl-4-aminocyclohexyl)methane, bis(3,5-diethyl-4-aminocyclohexyl)propane, bis(3-methyl-4-amino-5-isopropylcyclohexyl)methane, bis(3-methyl-4-amino-5-isopropylcyclohexyl)propane, bis(3,5-diisopropyl-4-aminocyclohexyl)methane, bis(3,5-diisopropyl-4-aminocyclohexyl)propane, bis(3-ethyl-4-cycloaminohexyl)methane, bis(3-ethyl-4-cycloaminohexyl)propane, bis(3-isopropyl-4-aminocyclohexyl)methane and bis(3-isopropyl-4-aminocyclohexyl)propane. Among them, bis(3-methyl-4-aminocyclohexyl)methane is preferred.

Examples of the aliphatic diamine include ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 2,2,4/2,4,4-trimethyl hexamethylenediamine and 5-methylnonamethylenediamine. Among them, hexamethylenediamine is preferred.

The amorphous polyamide (b) may include another copolymerization component.

Examples of such another copolymerization component include: lactams (e.g., ε-caprolactam, ω-lauryllactam and 2-pyrrolidone); amino acids (e.g., 6-aminocaproic acid, 11-aminoundecanoic acid and 12-aminododecanoic acid); alicyclic amines (e.g., 1,3-bis(aminomethyl)cyclohexane, 1,4-bis(aminomethyl)cyclohexane, 1-amino-3-aminomethyl-3,5,5-trimethyl cyclohexane, bis(aminopropyl)piperazine, bis(aminoethyl)piperazine and bis(aminomethyl)norbornene); aromatic diamines (e.g., m-xylylenediamine and p-xylylenediamine); aliphatic dicarboxylic acids (e.g., adipic acid, suberic acid, azelaic acid, sebacic acid and dodecanoic acid); and aromatic dicarboxylic acids other than terephthalic acid and isophthalic acid (e.g., naphthalene dicarboxylic acid). These may be used solely, or two or more of them may be used in combination.

The molar ratio of constituent units of alicyclic diamine: aliphatic diamine may be from 0:100 to 100:0, but preferably from 0:100 to 20:80.

The molar ratio of constituent units of terephthalic acid: isophthalic acid may be from 0:100 to 100:0, but preferably from 5:95 to 40:60.

The glass transition temperature of the amorphous polyamide (c) is not particularly limited, but it is preferably 100 to 270° C., and more preferably 120 to 255° C.

Among them, as the amorphous polyamide (b) of the present invention, nylon (polyhexamethylene isophthalamide), nylon 6T (polyhexamethylene terephthalamide), nylon 6IT (polyhexamethylene iso-co-terephthalamide) and nylon 6I6T (polyhexamethylene isophthalamide/polyhexamethylene terephthalamide copolymer) (I represents isophthalic acid and T represents terephthalic acid) are preferably used. Among them, nylon 6I6T is preferred.

In the present invention, by using the amorphous polyamide (b) which is mixed with the polyamide (a) at a predetermined ratio, easily tearable properties and pinhole resistance can be improved without impairing gas barrier properties. In addition, excellent surface appearance of the film can be obtained.

The content of the polyamide (a) in the barrier layer (B) is 30 to 70% by mass, preferably 40% by mass or more and more preferably 45% by mass, and preferably 60% by mass or less and more preferably 55% by mass or less based on the total mass of the barrier layer (B). In particular, the content of the polyamide (a) is preferably 40 to 60% by mass, and more preferably 45 to 55% by mass. Further, the content of the amorphous polyamide (b) is 30 to 70% by mass, preferably 40% by mass or more and more preferably 45% by mass, and preferably 60% by mass or less and more preferably 55% by mass or less based on the total mass of the barrier layer (B). In particular, the content of the amorphous polyamide (b) is preferably 40 to 60% by mass, and more preferably 45 to 55% by mass. When the mixing ratios of the polyamide (a) and the amorphous polyamide (b) are within the above-described ranges, good balance between gas barrier properties, easily tearable properties and pinhole resistance can be obtained. Moreover, excellent surface appearance of the film can be obtained. Furthermore, since wettability of the barrier layer can be improved, when the film is cut, for example, by tearing it up, the aluminum vapor deposition layer (A) is not easily detached from the biaxially oriented film.

The wetting tension of the barrier layer (B) is preferably 50 to 65 mN/m, more preferably 52 to 65 mN/m, and even more preferably 54 to 65 mN/m. The method for measuring the wetting tension is as explained in the Examples.

Further, the thickness of the barrier layer (B) is preferably 0.1 to 3 µm, more preferably 0.1 to 2 µm, even more preferably 0.1 to 1.5 µm, particularly preferably 0.3 to 1.5 µm, and still more preferably 0.4 to 1.5 µm. Further, the thickness of the barrier layer (B) is preferably 0.5 to 7.5%, and more preferably 2.0 to 7.5% relative to the total thickness of the easily tearable aluminum-vapor-deposited biaxially oriented film.

Adhesive Layer (C)

In the present invention, the adhesive layer (C) is a layer for adhesion between the barrier layer (B) and the polypropylene layer (D).

Examples of an adhesive component constituting the adhesive layer (C) include isocyanate-based, polyurethane-based, polyester-based, polyethyleneimine-based, polybutadiene-based, polyolefin-based and alkyltitanate-based adhesive components. Among them, because of good adhesion, heat resistance and water resistance, polyolefin-based, isocyanate-based, polyurethane-based and polyester-based adhesive components are preferred, and polyolefin-based adhesive components are particularly preferred.

In particular, an acid-modified polyolefin obtained by graft-modifying a polyolefin with an unsaturated carboxylic acid or an anhydride thereof is preferred. The acid-modified polyolefin is generally and widely used as an adhesive resin.

Specific examples of the polyolefin constituting the acid-modified polyolefin include: polyethylenes typified by low density polyethylenes, medium density polyethylenes, high density polyethylenes, linear low density polyethylenes, etc.; polypropylenes typified by propylene homopolymers, ethylene-propylene block copolymers, ethylene-propylene random copolymers, etc.; homopolymers of an ethylene-based hydrocarbon having 2 or more carbon atoms such as polybutene-1 and polymethylpentene-1; homopolymers of a $C_{3-20}$ α-olefin; copolymers of a $C_{3-20}$ α-olefin; and copolymers of a $C_{3-20}$ α-olefin and a cyclic olefin.

Specific examples of the unsaturated carboxylic acid or anhydride thereof which modifies the polyolefin include acrylic acid, methacrylic acid, α-ethylacrylic acid, maleic acid, fumaric acid, itaconic acid, citraconic acid, tetrahydrophthalic acid, chloromaleic acid, butenylsuccinic acid and acid anhydrides thereof. Among them, maleic acid and maleic anhydride are preferably used.

In the present invention, among acid-modified polyolefins, those obtained by graft-modifying a polypropylene with an unsaturated carboxylic acid or an anhydride thereof are preferably used because excellent adhesion between the barrier layer (B) and the polypropylene layer (D) is obtained thereby.

As the method for obtaining the acid-modified polyolefin by graft copolymerization of a polyolefin with an unsaturated carboxylic acid or anhydride thereof, various conventionally known methods can be used. Examples thereof include: a method in which a polyolefin is melted using an extruder or the like and a graft monomer is added thereto to perform copolymerization; a method in which a polyolefin is dissolved in a solvent and a graft monomer is added thereto to perform copolymerization; and a method in which an aqueous suspension of a polyolefin is prepared and then a graft monomer is added thereto to perform copolymerization.

These adhesive components may be used solely, or two or more of them may be used in combination. Further, auxiliary components which can be usually blended such as an antioxidant, an anti-blocking agent, a lubricant, an antistatic agent, a coloring agent, a masking agent and other additives may be blended in the adhesive layer (C).

The thickness of the adhesive layer (C) is preferably 0.1 to 5.0 µm, more preferably 0.1 to 4.0 µm, even more preferably 0.5 to 3.0 µm, and particularly preferably 1.0 to 2.0 µm. Further, the thickness of the adhesive layer (B) is preferably 0.5 to 20%, and more preferably 5 to 10% relative to the total thickness of the easily tearable aluminum-vapor-deposited biaxially oriented film.

Polypropylene Layer (D)

In the present invention, as the polypropylene layer (D), various crystalline propylene polymers can be used. Examples of the propylene polymer include propylene homopolymers and copolymers of a propylene and a small amount of another olefin or the like. Among them, propylene homopolymers, propylene-α-olefin block copolymers such as a propylene-ethylene block copolymer, etc. are preferably used.

Further, auxiliary components which can be usually blended such as an antioxidant, an anti-blocking agent, a lubricant, an antistatic agent, a coloring agent, a masking agent and other additives may be blended in the propylene polymer.

From the viewpoint of environmental protection, a recycled propylene obtained by recycling the propylene polymer may be used. In one embodiment of the present invention, the polypropylene layer (D) preferably has a recycled propylene layer (D1) and a propylene layer (D2) (non-recycled propylene layer).

The thickness of the polypropylene layer (D) is preferably 10 to 20 µm, more preferably 10 to 17 µm, even more preferably 11 to 17 µm, and particularly preferably 12 to 17 µm. Further, the thickness of the polypropylene layer (B) is preferably 50 to 85%, and more preferably 60 to 85% relative to the total thickness of the easily tearable aluminum-vapor-deposited biaxially oriented film.

When using the recycled propylene layer (D1) and the propylene layer (D2) as the polypropylene-based support layer (D), the thicknesses of the recycled propylene layer (D1) and the propylene layer (D2) may be suitably determined depending on intended use and purpose thereof, and it is sufficient when the total of the thickness of the recycled propylene layer (D1) and the thickness of the propylene layer (D2) is within the above-described range.

Heat-Sealable Resin Layer (E)

According to need, the easily tearable aluminum-vapor-deposited biaxially oriented film of the present invention may have a heat-sealable resin layer (E) at the outer side of the polypropylene layer (D), that is, at the opposite side of the adhesive layer (C).

As a material constituting the heat-sealable resin layer (E), various flexible resins can be used. In consideration of exertion of good heat sealability, examples thereof include various ethylene polymers and propylene polymers. Examples of ethylene polymers include ethylene homopolymers and copolymers of ethylene and a small amount of another olefin or the like. Examples of propylene polymers include propylene homopolymers and copolymers of propylene and a small amount of another olefin or the like. Among them, an ethylene-α-olefin random copolymer, a propylene-α-olefin random copolymer or an ethylene-vinylacetate copolymer is preferred.

In the heat-sealable resin layer (E), a color pigment such as titanium oxide; an additive such as an antioxidant, a slipping agent, an antistatic agent and a stabilizer; a filler such as calcium carbonate, clay, mica and silica; a deodorizer, etc. may be blended.

The thickness of the heat-sealable resin layer (E) is preferably 0.1 to 5 µm, more preferably 0.1 to 2.0 µm, even more preferably 0.2 to 1.8 µm, and particularly preferably 0.5 to 1.5 µm. Further, the thickness of the heat-sealable resin layer (E) is preferably 0.5 to 10%, and more preferably 2.5 to 7.5% relative to the total thickness of the easily tearable aluminum-vapor-deposited biaxially oriented film.

A biaxially oriented film including the barrier layer (B), the adhesive layer (C), the polypropylene layer (D), and optionally the heat-sealable resin layer (E) can be produced by producing an unstretched laminated film according to the below-described method and biaxially stretching the unstretched laminated film.

Firstly, an unstretched laminated film which is substantially amorphous and unoriented is produced using materials of the respective layers. The unstretched laminated film can be produced, for example, by coextrusion of the respective layers. Specifically, raw materials of the respective layers are melted using 3 or 4 extruders and extruded from a flat die (T-die) or annular die, thereby preparing the unstretched laminated film. The extrusion temperature at the time of coextrusion is: preferably 240 to 280° C., and more preferably 245 to 275° C. in the case of the barrier layer (B); preferably 160 to 240° C., and more preferably 170 to 230° C. in the case of the adhesive layer (C); preferably 180 to 250° C., and more preferably 190 to 245° C. in the case of the polypropylene layer (D); and preferably 160 to 250° C., and more preferably 170 to 245° C. in the case of the heat-sealable resin layer (E).

Regarding the barrier layer (B), the polyamide (a) and the amorphous polyamide (b) are subjected to dry blend in advance, and then the mixture is put into an extruder and extruded at the above-described extrusion temperature, thereby enabling exertion of easily tearable properties of an aluminum-vapor-deposited biaxially oriented film obtained.

Next, the obtained unstretched laminated film is stretched in the longitudinal direction that is the flow direction of the film (MD: machine direction) and in the lateral direction that is perpendicular thereto (TD: transverse direction) successively or simultaneously. The stretching process may be sequentially carried out after the production of the unstretched laminated film that is a melted laminate obtained by melt extrusion. Alternatively, the stretching process may be carried out after the unstretched laminated film that is a melted laminate is temporarily wound around a roll and cooled.

The method for biaxial stretching is not particularly limited, and conventionally known stretching methods such as tenter-type successive biaxial stretching, tenter-type simultaneous biaxial stretching and tubular-type simultaneous biaxial stretching can be employed.

In the simultaneous biaxial stretching method, the unstretched laminated film is stretched in the longitudinal and lateral directions simultaneously using a tenter-type simultaneous biaxial stretching machine. In the successive biaxial stretching method, the unstretched laminated film melt-extruded from a T-die is stretched in the longitudinal direction using a roll-type stretching machine, and then it is stretched in the lateral direction using a tenter-type stretching machine. In the tubular stretching method, a tubular sheet formed using an annular die is stretched in the longitudinal and lateral directions simultaneously with gas pressure in an inflation manner.

In the case where the stretching process is carried out after the unstretched laminated film is temporarily wound around a roll and cooled, the temperature of a cooling roll is set at preferably 20 to 110° C., and more preferably 20 to 95° C. By setting the temperature of the cooling roll within the above-described range, at the time of stretching in the longitudinal and lateral directions using the roll later, adhesion to and winding around the roll are prevented, and it enables stable production. When the temperature of the cooling roll is not within the above-described range, crystallization of the polyamide proceeds, and at the time of stretching in the longitudinal and lateral directions using the roll later, poor stretch and whitening may occur, and therefore it is undesirable.

In the present invention, stretching is carried out at stretching magnifications of preferably 3 to 9 times in the longitudinal direction (MD) and 3 to 8 times in the lateral direction (TD), more preferably 5 to 8.5 times in the longitudinal direction (MD) and 5 to 7.5 times in the lateral direction (TD), and even more preferably 7.5 to 8.5 times in the longitudinal direction (MD) and 6.5 to 7.5 times in the lateral direction (TD). By stretching the unstretched laminated film at stretching magnifications within the above-described ranges, a film having excellent gas barrier properties and pinhole resistance can be obtained.

For example, when using the tenter-type successive biaxial stretching method, the unstretched laminated film is heated to 80 to 120° C. and stretched 3 to 9 times in the longitudinal direction (MD) using a roll-type longitudinal stretching machine, and then it is heated to 80 to 120° C. using a tenter-type lateral stretching machine and stretched 3 to 8 times in the lateral direction (TD), thereby producing a biaxially oriented film.

Meanwhile, when using the tenter-type simultaneous biaxial stretching method or tubular-type simultaneous biaxial stretching method, the film is stretched, for example, at 80 to 120° C., 3 to 9 times in the longitudinal direction (MD) and 3 to 8 times in the lateral direction (TD) simultaneously, thereby producing a biaxially oriented film.

When the stretching temperature is too low, a fracture or poor outer appearance may be caused by poor stretch due to insufficient heating, and therefore it is undesirable. Further, when the stretching temperature is too high, crystallization proceeds and poor stretch and whitening may occur, and therefore it is undesirable.

As described above, the stretching magnification in the longitudinal direction is preferably 3 to 9 times. When the stretching magnification in the longitudinal direction (MD) is less than 3 times, mechanical physical properties may be reduced. Further, when it is more than 9 times, a fracture, whitening or poor outer appearance may be caused and pinhole resistance may be deteriorated, and therefore it is undesirable.

The stretching magnification in the lateral direction (TD) is preferably 3 to 8 times. When the stretching magnification in the lateral direction (TD) is less than 3 times, mechanical physical properties and pinhole resistance may be reduced, and therefore it is undesirable. When it is more than 8 times, a fracture, whitening or poor outer appearance may be caused, and therefore it is undesirable.

The laminated film stretched according to the above-described method is then preferably subjected to the heat treatment. For example, by performing the heat treatment at 150 to 220° C. for 4 to 60 seconds, a biaxially oriented film having excellent size stability can be obtained.

After performing the heat treatment, relaxation treatment (toe-in) in the lateral direction (TD) may be performed within a range in which the optical axis stability of both the ends of the film is not impaired by bowing phenomenon, for example, within a range of from 0.5 to 5%. When the stretching magnification in the lateral direction (TD) is high, toe-in is preferably increased.

Aluminum Vapor Deposition Layer (A)

The easily tearable aluminum-vapor-deposited biaxially oriented film of the present invention has an aluminum vapor deposition layer (A). The aluminum vapor deposition layer (A) can be formed on the barrier layer (B) of the biaxially oriented film prepared in the above-described manner using, for example, a vacuum deposition method.

The vacuum deposition method can be carried out by heating a high-purity aluminum metal to usually 1400 to 1500° C. by high frequency induction heating, direct electrical heating, electron beam heating or the like to be evaporated and using a vacuum degree of about $10^{-4}$ torr, for example, a vacuum degree of about $1.0 \times 10^{-4}$ to $5.0 \times 10^{-4}$ torr.

The thickness of the aluminum vapor deposition layer (A) is preferably 20 to 100 nm, more preferably 25 to 95 nm, and even more preferably 30 to 90 nm.

According to the present invention, wettability of the barrier layer (B) can be improved by inclusion of the specific polyamide (a) and amorphous polyamide (b) at a specific ratio as the barrier layer (B), and therefore, the aluminum vapor deposition layer (A) can be layered on the biaxially oriented film with good adhesion. As a result, the aluminum vapor deposition layer (A) is not easily detached from the biaxially oriented film, and pinhole resistance can be improved.

Further, since the aluminum-vapor-deposited biaxially oriented film of the present invention has a constitution in which the aluminum vapor deposition layer (A) is directly vapor-deposited on the barrier layer (B), surface appearance of the aluminum-vapor-deposited biaxially oriented film is affected by the condition of the barrier layer. In the present invention, the dispersion state in the barrier layer is appropriately controlled by inclusion of the polyamide (a) and the amorphous polyamide (b) at a specific ratio, and therefore the aluminum-vapor-deposited biaxially oriented film obtained has excellent surface appearance.

In the easily tearable aluminum-vapor-deposited biaxially oriented film of the present invention, it is sufficient when the aluminum vapor deposition layer (A), the barrier layer (B), the adhesive layer (C) and the polypropylene layer (D) are layered in this order, and according to need, the heat-sealable resin layer (E), a print layer, etc. may also be layered.

According to one embodiment of the present invention, the easily tearable aluminum-vapor-deposited biaxially oriented film of the present invention preferably has a layer structure consisting of the aluminum vapor deposition layer (A), the barrier layer (B), the adhesive layer (C), the recycled propylene layer (D1) and the propylene layer (D2).

Further, according to one embodiment of the present invention, the easily tearable aluminum-vapor-deposited biaxially oriented film of the present invention preferably has a layer structure consisting of the aluminum vapor deposition layer (A), the barrier layer (B), the adhesive layer (C), the recycled propylene layer (D1), the propylene layer (D2) and the heat-sealable resin layer (E).

The thickness of the easily tearable aluminum-vapor-deposited biaxially oriented film of the present invention is suitably determined depending on intended use thereof, but it is usually 10 to 50 μm, preferably 11 to 40 μm, more preferably 12 to 30 μm, and even more preferably 13 to 25 μm.

The easily tearable aluminum-vapor-deposited biaxially oriented film of the present invention has an oxygen transmission coefficient (OTC) at 23° C. and 60% RH of preferably 0.001 to 0.008 cc·mm/(m²·atm·day), more preferably 0.001 to 0.007 cc·mm/(m²·atm·day), and even more preferably 0.001 to 0.006 cc·mm/(m²·atm·day). The method for measuring the oxygen transmission coefficient (OTC) is as described in the Examples.

Further, regarding the easily tearable aluminum-vapor-deposited biaxially oriented film of the present invention, the number of defects in a film of 210 mm (MD direction)× 297 mm (TD direction) after a Gelbo flex test (3000 times) at 23° C. and 50% RH is preferably 0 to 30, more preferably 0 to 25, even more preferably 0 to 20, and particularly preferably 0 to 14. The method for the Gelbo flex test is as described in the Examples.

The easily tearable aluminum-vapor-deposited biaxially oriented film of the present invention is preferably used as a packaging material or a container. It is particularly suitable for packaging an article, which requires gas barrier properties and light-shielding properties, such as foods including boil-in-the-bag foods and confectioneries such as potato chips and pharmaceutical products. Note that the present invention includes not only a container made of the easily tearable aluminum-vapor-deposited biaxially oriented film of the present invention, but also a container, a part of which is made of the easily tearable aluminum-vapor-deposited biaxially oriented film of the present invention.

EXAMPLES

Hereinafter, the present invention will be described in more detail by way of examples, but the present invention is not limited to the examples. Note that evaluation methods and measurement methods in the examples, etc. are as described below.

[1] Easily Tearable Properties (Linear Cutting Properties)

Each film sample obtained in the Examples and Comparative Examples was cut into a rectangle shape (20 mm in the lateral direction×300 mm in the longitudinal direction, the MD direction was the longitudinal direction), and a notch of 20 mm (notch portion) was made in the center of a lateral side (see FIG. 1(a)). After that, the notch portion (grip) was held and torn (see FIG. 1(b)), and the distance from the center of the lateral side was measured as a deviation. The case where the deviation was 5 mm or less was evaluated as "A", and the case where the deviation was more than 5 mm was evaluated as "B".

[2] Oxygen Transmission Coefficient (OTC)

The oxygen transmission coefficient of each film sample obtained in the Examples and Comparative Examples was measured in accordance with ASTM D3985. Specifically, the oxygen transmission coefficient (unit: cc mm/m$^2$·day·atm) of each film sample (thickness: 20 μm) obtained in the Examples and Comparative Examples in an environment at 23° C. and 60% RH (relative humidity) was measured using an oxygen transmission coefficient measurement apparatus (manufactured by MOCON, Inc., trade name: "OX-TRAN 2/21A").

[3] Pinhole Resistance (after Gelbo Flex Test (3000 Times))

Using a Gelbo flex tester manufactured by Rigaku Kogyo, each film sample (thickness: 20 μm) obtained in the Examples and Comparative Examples was cut into a size of 210 mm (MD direction)×297 mm (TD direction), and the flexural fatigue resistance thereof was measured according to the below-described method. Initially, the obtained film sample was cylindrically attached to a fixed head having a diameter of 8.89 cm (3.5 inch) and a movable head having the same diameter which was placed in parallel with the fixed head with the distance from the fixed head being 17.78 cm (7 inch). The movement of the movable head was controlled by a shaft attached to the center of the movable head. Firstly, the movable head was brought closer to the fixed head (8.89 cm (3.5 inch)) while twisting the movable head 440 degrees. Secondly, the movable head was further brought closer to the fixed head (6.35 cm (2.5 inch)) by horizontal movement, and then returned to its original state by opposite movement. This is one cycle, and the cycle was run 3000 times at 23° C. and 50% RH and at a rate of 40 times/min. After the cycle was repeatedly run 3000 times, the number of pinholes in a portion to be tested (177.8 mm (MD direction)×297 mm (TD direction)) was measured. In the method for measuring the number, the number of pinholes was measured using a pinhole tester (weak current discharge method).

[4] Wettability (Wetting Tension) of Barrier Layer (B)

A wet indicator (manufactured by Wako Pure Chemical Industries, Ltd., "Wetting Tension Test Mixture") was applied to the barrier layer (B) of each film sample (thickness: 20 μm) prior to corona treatment obtained in the Examples and Comparative Examples, and a value obtained immediately prior to aggregation of the wet indicator was visually observed and it was evaluated as a value of wettability.

Production Example 1

Precisely weighed 12,120 g (82.94 mol) of adipic acid (AA), 880 g (5.29 mol) of isophthalic acid (IPA), 10.96 g (0.10 mol) of sodium hypophosphite and 5.68 g (0.07 mol) of sodium acetate were put into an autoclave for melt polymerization having an inner volume of 50 L equipped with an agitator, a partial condenser, a total condenser, a pressure regulator, a thermometer, a dropping tank, a pump, an aspirator, a nitrogen introducing tube, a bottom discharge valve and a strand die, and substitution with nitrogen was sufficiently performed. After that, the autoclave for melt polymerization was sealed, and the temperature in the autoclave for melt polymerization was elevated to 170° C. while stirring with the pressure therein being kept at 0.4 MPaG.

After the temperature reached 170° C., 11,520 g (84.59 mol) of m-xylylenediamine (MXDA) stored in the dropping tank (feed molar ratio of diamine component/dicarboxylic acid component (MXDA/(AA+IPA)=0.9587) was started to be added dropwise to the melted raw materials in the autoclave for melt polymerization, and the temperature in the autoclave for melt polymerization was continuously elevated to 260° C. while removing condensation water produced to the outside of the system with the pressure in the autoclave for melt polymerization being kept at 0.4 MPaG.

After dropping of m-xylylenediamine was finished, the pressure in the autoclave for melt polymerization was gradually returned to ordinary pressure, then using the aspirator, the pressure in the autoclave for melt polymerization was reduced to 80 kPaG and condensation water was removed. The agitation torque of the agitator was observed during reducing the pressure, and stirring was stopped when the torque reached a predetermined value. The pressure in the autoclave for melt polymerization was increased with nitrogen, and the bottom discharge valve was opened, thereby obtaining a melt-polymerized product of a polyamide (a1) (isophthalic acid-copolymerized polymethaxylylene adipamide) that is a polycondensated product of adipic acid, isophthalic acid and m-xylylenediamine (relative viscosity 2.1).

The pellet of the polyamide (a1) as the melt-polymerized product was fed into a stainless steel rotating drum type heating apparatus and rotation was performed at 5 rpm. Substitution with nitrogen was sufficiently performed, and further, under a small amount of nitrogen stream, the temperature in the reaction system was elevated from room temperature to 140° C. When the temperature in the reaction system reached 140° C., the pressure was reduced to 1 torr or less, and the temperature in the reaction system was further elevated to 190° C. over 130 minutes. From the time point at which the temperature in the system reached 190° C., a solid phase polymerization reaction was continuously performed at the same temperature for 60 minutes.

After the reaction was completed, reducing the pressure was finished, and the temperature in the system was decreased under nitrogen stream. When the temperature reached 60° C., the pellet was taken out, thereby obtaining a solid phase-polymerized product of isophthalic acid-copolymerized polymethaxylylene adipamide (MXD61). In the Examples, this polyamide (a1) (isophthalic acid-copolymerized polymethaxylylene adipamide) as the solid phase-polymerized product was used.

Regarding the solid phase-polymerized product of the polyamide (a1), the ratio of the isophthalic acid unit in the dicarboxylic acid constituent unit was 6.0 mol %, the relative viscosity was 2.7, the glass transition temperature=92° C., and the melting point (Tmo) was 229.0° C.

Example 1

30% by mass of the polyamide (a1) obtained in Production Example 1 and 70% by mass of an amorphous polyamide (manufactured by Du Pont-Mitsui Polychemicals Co., Ltd., trade name: SELAR PA3426, nylon 6I6T) were subjected to dry blend to prepare a mixed resin for a barrier layer.

The mixed resin for the barrier layer (forming a layer B) was extruded from an extruder having a cylinder diameter of 35 mm at 250° C. to 270° C. (layer B); an adhesive resin (forming a layer C, manufactured by Mitsubishi Chemical Corporation, trade name: Modic P513V) was extruded from an extruder having a cylinder diameter of 50 mm at 180° C. to 200° C. (layer C); a polypropylene (forming a layer D, manufactured by Japan Polypropylene Corporation, trade name: NOVATEC PPFL6CK) was extruded from an extruder having cylinder diameters of 55 mm and 43 mm at 200° C. to 220° C. (layer D); and a heat-sealable resin (forming a layer E, manufactured by Borealis A/S, trade name: Boeseal TD110BF) was extruded from an extruder having a cylinder diameter of 35 mm at 180° C. to 200° C. (layer E), and these were passed through a feed block to form a melted multilayer body (layer B/layer C/layer D/layer E). Using the obtained melted laminate, an unstretched laminated film was produced according to a T-die/cooling roll method (roll temperature: 90° C.).

The obtained unstretched laminated film was subjected to the heat treatment at 120° C. for 30 seconds, and after that, it was stretched 8 times in the machine direction (MD) and stretched 7 times in the lateral direction (TD). After that, it was subjected to the heat treatment at 215° C. for 6 seconds, thereby obtaining a biaxially oriented film having a thickness of 20 µm, which has the layer B of about 1.2 µm, the layer C of about 1.5 µm, the layer D of about 16 µm and the layer E of about 1 µm.

After that, the surface of the layer B of the obtained biaxially oriented film was subjected to the corona treatment with a corona discharge treatment amount of 70 w·min/m². The aluminum vapor deposition treatment was carried out in a metal evaporator manufactured by Applied Films Corporation. The metal evaporator was evacuated to obtain a high vacuum of $8\times10^{-5}$ Torr, and then oxygen was introduced therein to obtain a vacuum of $3\times10^{-4}$ Torr, and an aluminum metal having a purity of 99.99% was evaporated by heating, thereby forming an aluminum vapor deposition layer (layer A) having a thickness of about 60 nm on the surface of the barrier layer (layer B) to obtain the aluminum-vapor-deposited biaxially oriented film of the present invention.

Example 2

An aluminum-vapor-deposited biaxially oriented film was obtained in a manner similar to that in Example 1, except that a product obtained by mixing 50% by mass of the polyamide (a1) and 50% by mass of the amorphous polyamide was used as the material of the layer B.

Example 3

An aluminum-vapor-deposited biaxially oriented film was obtained in a manner similar to that in Example 1, except that a product obtained by mixing 70% by mass of the polyamide (a1) and 30% by mass of the amorphous polyamide was used as the material of the layer B.

Comparative Example 1

An aluminum-vapor-deposited biaxially oriented film was obtained in a manner similar to that in Example 1, except that EVOH (trade name: EVAL G156B) was used as the material of the layer B.

Comparative Example 2

An aluminum-vapor-deposited biaxially oriented film having a layer structure of layer A/layer D/layer E was obtained in a manner similar to that in Example 1, except that the layer B and the layer C were not formed.

Comparative Example 3

An aluminum-vapor-deposited biaxially oriented film was obtained in a manner similar to that in Example 1, except that a product obtained by mixing 20% by mass of the polyamide (a1) and 80% by mass of the amorphous polyamide was used as the material of the layer B.

Comparative Example 4

An aluminum-vapor-deposited biaxially oriented film was obtained in a manner similar to that in Example 1, except that a product obtained by mixing 80% by mass of the polyamide (a1) and 20% by mass of the amorphous polyamide was used as the material of the layer B.

Comparative Example 5

An aluminum-vapor-deposited biaxially oriented film was obtained in a manner similar to that in Example 1, except that the amorphous polyamide was used as the material of the layer B.

The results of Examples 1-3 and Comparative Examples 1-5 are shown in Table 1.

TABLE 1

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Constitution of barrier layer (B) | | PA (a1)/ PA (6i6T) = 30/70 | PA (a1)/ PA (6i6T) = 50/50 | PA (a1)/ PA (6i6T) = 70/30 | EVOH | Absent | PA (a1)/ PA (6i6T) = 20/80 | PA (a1)/ PA (6i6T) = 80/20 | PA (6i6T) |
| Easily tearable properties | [—] | A | A | A | B | B | B | B | B |
| Wettability | [mN/m] | 65 | 58 | 60 | 46 | — | 52 | 62 | 48 |
| OTR | cc · mm/ (m2 · atm · day) | 0.0040 | 0.0018 | 0.0015 | 0.016 | 0.150 | 0.0100 | 0.0013 | 0.0110 |
| Pinhole resistance (After Gelbo flex test (3000 times)) | [Number] | 9 | 10 | 11 | 15 | 40 | 10 | 8 | 10 |

As shown in the table, the easily tearable aluminum-vapor-deposited biaxially oriented film of the present invention has good balance between easily tearable properties, wettability and gas barrier properties and is also excellent in pinhole resistance because the barrier layer (B) has the specific polyamide (a) and the amorphous polyamide (b) at a specific ratio (Examples 1, 2 and 3). Moreover, the film is also excellent in surface appearance thereof.

Meanwhile, when the ethylene vinyl alcohol copolymer was used as the barrier layer, though good gas barrier properties were obtained, easily tearable properties and pinhole resistance were reduced (Comparative Example 1). Further, when the barrier layer was not layered, gas barrier properties were not obtained, and in addition, easily tearable properties and pinhole resistance were not obtained (Comparative Example 2). When only the amorphous polyamide was used as the barrier layer, desired easily tearable properties were not obtained (Comparative Example 5).

Further, it was found that even when the mixture of the polyamide (a) and the amorphous polyamide (b) is used as the barrier layer (B), if the ratio thereof is not within the range defined by the present invention, desired easily tearable properties are not obtained (Comparative Examples 3 and 4).

The easily tearable aluminum-vapor-deposited biaxially oriented film of the present invention has excellent balance between gas barrier properties, easily tearable properties and pinhole resistance and is also excellent in surface appearance, and therefore is particularly suitable for packaging an article, which requires gas barrier properties and light-shielding properties, such as foods including boil-in-the-bag foods and confectioneries and pharmaceutical products.

The invention claimed is:

1. A tearable aluminum-vapor-deposited biaxially oriented film in which at least an aluminum vapor deposition layer (A), a barrier layer (B), an adhesive layer (C) and a polypropylene layer (D) are layered in this order, wherein:
    the barrier layer (B) includes a mixture of a polyamide (a) and an amorphous polyamide (b);
    the polyamide (a) includes diamine units including at least 90 mol % of constituent units derived from xylylene diamine and dicarboxylic acid units including at least 90 mol % of constituent units derived from adipic acid;
    the content of the polyamide (a) in the barrier layer (B) is 30 to 70% by mass; and
    the content of the amorphous polyamide (b) in the barrier layer (B) is 30 to 70% by mass;
    wherein the amorphous polyamide (b) is nylon 616T (polyhexamethylene isophthalamide/polyhexamethylene terephthalamide copolymer);
    wherein the polyamide (a) is isophthalic acid-copolymerized polymethaxylylene adipamide.

2. The tearable aluminum-vapor-deposited biaxially oriented film according to claim 1, wherein the barrier layer (B) has a wetting tension of 50 to 65 mN/m.

3. The tearable aluminum-vapor-deposited biaxially oriented film according to claim 1, wherein the thickness of the barrier layer (B) is 0.5 to 7.5% relative to the total thickness of the tearable aluminum-vapor-deposited biaxially oriented film.

4. The tearable aluminum-vapor-deposited biaxially oriented film according to claim 1, wherein the thickness of the tearable aluminum-vapor-deposited biaxially oriented film is 10 to 50 μm.

5. The tearable aluminum-vapor-deposited biaxially oriented film according to claim 1, wherein the polypropylene layer (D) includes a recycled propylene layer (D1) and a propylene layer (D2).

6. The tearable aluminum-vapor-deposited biaxially oriented film according to claim 1, which further has a heat-sealable resin layer (E) at the outer side of the polypropylene layer (D).

7. The tearable aluminum-vapor-deposited biaxially oriented film according to claim 1, which has an oxygen transmission coefficient (OTC) at 23° C. and 60% RH of 0.001 to 0.008 cc·mm/(m$^2$·atm·day).

8. The tearable aluminum-vapor-deposited biaxially oriented film according to claim 1, wherein the number of defects after a Gelbo flex test (3000 times) at 23° C. and 50% RH is 0 to 30.

9. A container, at least a part of which is made of the tearable aluminum-vapor-deposited biaxially oriented film according to claim 1.

10. The tearable aluminum-vapor-deposited biaxially oriented film according to claim 1, wherein the stretching magnification of the film in the longitudinal direction (MD) is 5 to 8.5 times and the stretching magnification of the film in the lateral direction (TD) is 5 to 7.5 times.

11. The tearable aluminum-vapor-deposited biaxially oriented film according to claim 1, wherein the film is a simultaneous biaxial stretched film.

* * * * *

UNITED STATES PATENT AND TRADEMARK OFFICE
CERTIFICATE OF CORRECTION

PATENT NO. : 11,390,058 B2
APPLICATION NO. : 16/344525
DATED : July 19, 2022
INVENTOR(S) : Tomo Chiba It is certified that error appears in the above-identified patent and that said Letters Patent is hereby corrected as shown below:

In the Claims

Claim 1, Column 17, Line 42, delete "6l6T" and insert -- 6I6T --.

Signed and Sealed this
Third Day of January, 2023

Katherine Kelly Vidal
*Director of the United States Patent and Trademark Office*